(12) United States Patent
Droms et al.

(10) Patent No.: US 7,039,035 B2
(45) Date of Patent: May 2, 2006

(54) ARRANGEMENT IN AN ACCESS ROUTER FOR OPTIMIZING MOBILE ROUTER CONNECTIONS BASED ON DELEGATED NETWORK PREFIXES

(75) Inventors: Ralph Edward Droms, Westford, MA (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 10/806,312

(22) Filed: Mar. 23, 2004

(65) Prior Publication Data

US 2005/0099971 A1 May 12, 2005

Related U.S. Application Data

(60) Provisional application No. 60/518,346, filed on Nov. 10, 2003.

(51) Int. Cl.
 *H04Q 7/24* (2006.01)
(52) U.S. Cl. .................. 370/338; 370/349; 370/370; 370/401
(58) Field of Classification Search ............... 370/328, 370/338, 349, 389, 400, 401, 255, 256; 709/217, 709/218, 238, 243, 249, 252
 See application file for complete search history.

(56) References Cited

U.S. PATENT DOCUMENTS

| 2001/0024443 | A1* | 9/2001 | Alriksson et al. ........... 370/401 |
| 2002/0039357 | A1* | 4/2002 | Lipasti et al. ............... 370/338 |
| 2002/0061009 | A1* | 5/2002 | Sorenson .................... 370/351 |
| 2003/0095504 | A1* | 5/2003 | Ogier .......................... 370/235 |
| 2003/0179742 | A1* | 9/2003 | Ogier et al. ................. 370/351 |
| 2004/0032852 | A1  | 2/2004 | Thubert et al. |
| 2004/0057440 | A1  | 3/2004 | Thubert et al. |
| 2004/0081152 | A1  | 4/2004 | Thubert et al. |
| 2004/0117339 | A1  | 6/2004 | Thubert et al. |

OTHER PUBLICATIONS

Narten et al., "Neighbor Discovery for IP Version 6 (IPv6)", Request for Comments 2461, IETF Network Working Group, Dec. 1998.
Droms et al., "Dynamic Host Configuration Protocol for IPv6 (DHCPv6)", Request for Comments 3315, IETF Network Group, Jul. 2003.

(Continued)

*Primary Examiner*—Bob A. Phunkulh
(74) *Attorney, Agent, or Firm*—Leon R. Turkevich

(57) ABSTRACT

An access router of a local mobile network includes a delegation resource for delegating address prefixes and a routing resource configured for parsing reverse routing headers from received data packets. The delegation resource supplies each mobile router attaching to the local mobile network with a corresponding unique delegated address prefix within an available network prefix for use within the local mobile network. Each mobile router attached to the access router via another mobile router utilizes a reverse routing header to establish a tunnel with the access router, enabling the access router to source route messages to the mobile router via its corresponding local care-of address and next-hop addresses specified in the reverse routing header. Each mobile router creates a remote care-of address based on the delegated address prefix, minimizing the need for binding updates with the corresponding home agent as the mobile router moves within the local mobile network.

52 Claims, 9 Drawing Sheets

OTHER PUBLICATIONS

Hinden et al., "Internet Protocol Version 6 (IPv6) Addressing Architecture", Request for Comments 3513, IETF Network Working Group, Apr. 2003.

Troan et al., "IPv6 Prefix Options for Dynamic Host Configuration Protocol (DHCP) version 6", Request for Comments 3633, IETF Network Working Group, Dec. 2003.

Thubert et al., "IPv6 Reverse Routing Header and its application to Mobile Networks", IETF Network Working Group, Internet Draft, draft-thubert-nemo-reverse-routing-header-04, Feb. 2004.

Kang et al, "Route Optimization for Mobile Network by Using Bi-directional Between Home Agent and Top Level Mobile Router", Individual Submission, Internet Draft, draft-hkang-nemo-ro-timr-00.txt, Jul. 2003.

Troan et al, "IPv6 Prefix Options for DHCPv6", IETF Network Working Group, Internet Draft, draft-ietf-dhc-dhcpv6-opt-prefix-dlegation-04.txt, Jun. 6, 2003.

Lee et al., "Route Optimization for Mobile Nodes in Mobile Network based on Prefix Delegation", Individual Submission, Internet Draft, drafy-leekj-nemo-ro-pd-02.txt, Feb. 16, 2004.

Ohnishi et al., "HMIP based Route optimization method in a mobile network", NEMO Working Group, Internet Draft, draft-ohnishi-nemo-ro-hmip-00.txt, Oct. 2003.

Johnson et al., "Mobility Support in IPv6", IETF Mobile IP Working Group, Internet Draft, draft-ietf-mobileip-ipv6-24.txt, Jun. 30, 2003.

Thubert et al., "Taxonomy of Route Optimization models in the Nemo Context", IETF Network Working Group, Internet Draft, draft-thubert-nemo-ro-taxonomy-02, Feb. 15, 2004.

Soliman et al., "Hierarchical Mobile IPv6 mobility management (HMIPv6)", IETF Mobile IP Working Group, Internet Draft, draft-ietf-mobileip-hmipv6-08.txt, Jun. 2003.

* cited by examiner

ARRANGEMENT IN AN ACCESS ROUTER FOR OPTIMIZING MOBILE ROUTER CONNECTIONS BASED ON DELEGATED NETWORK PREFIXES

CROSS REFERENCE TO RELATED APPLICATIONS

This application claims priority from Provisional Application 60/518,346, filed Nov. 10, 2003, the disclosure of which is incorporated in its entirety herein by reference.

BACKGROUND OF THE INVENTION

1. Field of the Invention

The present invention relates to route optimization by a mobile router of a mobile network, for example a mobile IP network (NEMO) or an Internet Protocol (IP) based mobile ad hoc network (MANET), and an access router providing an attachment point to a wide area network such as the Internet.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-24.txt (the disclosure of which is incorporated in its entirety herein by reference). According to Johnson et al., the Mobile IPv6 protocol enables a mobile node to move from one link to another without changing the mobile node's IP address. In particular, the mobile node is assigned a "home address". The "home address" is an IP address assigned to the mobile node within its home subnet prefix on its home link. While a mobile node is at home, packets addressed to its home address are routed to the mobile node's home link, using conventional Internet routing mechanisms.

The mobile node also is assigned a home agent for registering any care-of address used by the mobile node at its point of attachment to the Internet while the mobile node is away from its home link. A care-of address is an IP address associated with a mobile node that has the subnet prefix of a particular link away from its home link (i.e., a foreign link). A home agent is a router on a mobile node's home link with which the mobile node has registered its current care-of address. While the mobile node is away from its home link, the home agent intercepts packets on the home link destined to the mobile node's home address; the home agent encapsulates the packets, and tunnels the packets to the mobile node's registered care-of address.

The NEMO working group has extended the features of Mobile IPv6 (which to date have been limited to an IPv6 mobile node such as a wireless laptop) to a mobile network based on providing routing protocols that enable the mobile router to attach to an access router and establish route optimization for the mobile router and its associated mobile network. One example of proposed solutions for route optimization in a nested mobile network is disclosed in the Internet Draft by Thubert et al., "Taxonomy of Route Optimization models in the Nemo Context", available on the IETF website at http://www.ietf.org/internet-drafts/draft-thubert-nemo-ro-taxonomy-02.txt and the disclosure of which is incorporated in its entirety herein by reference (referred to hereinafter as "Thubert-RO"). In particular, Thubert-RO notes that NEMO enables Mobile Networks by extending Mobile IP to support Mobile Routers; Thubert-RO describes how Route Optimization as described in the context of MIPv6 can to be adapted for NEMO to optimize traffic routing between nodes in a mobile network and their correspondent nodes.

Another example of a proposed solution for route optimization is disclosed in the Internet Draft by Thubert et al., "IPv6 Reverse Routing Header and its application to Mobile Networks" available on the IETF website at http://www.ietf.org/internet-drafts/draft-thubert-nemo-reverse-routing-header-04.txt and the disclosure of which is incorporated in its entirety herein by reference (referred to hereinafter as "Thubert-RRH"). Thubert-RRH discloses that Mobile IP can be extended to support mobile routers, and enable nested mobile networks, using a reverse routing header that eliminates the need for nested tunnels between mobile routers and their home agents, but rather enables use of a single tunnel between a mobile router and its associated home agent.

One particular aspect of the above proposals is that the mobile router communicates with its associated home agent to ensure reachability between the mobile router and the wide area packet switched network (e.g., the Internet). It may be desirable in certain cases to reduce the necessity for a mobile router to establish a tunnel with its associated home agent in order to have connectivity with the wide area packet switched network. For example, it may be desirable in certain cases that a mobile router can establish anonymous route connections without notifying the home agent of the source of the route connections. It also may be desirable in certain cases that a mobile router can establish multiple attachments with different access routers as the mobile router moves (i.e., "roams") across the respective service of the access routers, without the necessity of notifying the home agent of each attachment, especially when the attachment may be for only a transient interval.

Other proposals attempt to minimize nesting of tunnels, as well as avoid a tunnel between a mobile router and its corresponding home agent, by adding prescribed operations to a top level mobile router of a mobile network. One example is described in the Internet Draft by Kang et al., "Route Optimization for Mobile Network by Using Bi-directional Between Home Agent and Top Level Mobile Router", available on the World Wide Web at http://www-.watersprings.org/pub/id/draft-hkang-nemo-ro-tlmr-00.txt and incorporated in its entirety herein by reference.

Another example of minimizing nesting of tunnels and avoiding a tunnel between a mobile router and its corresponding home agent involves use of a mobility anchor point (MAP). A variation of the Mobile IPv6 protocol is disclosed in an IETF Internet Draft by Soliman et al., "Hierarchical Mobile IPv6 mobility management (HMIPv6)" June 2003, available on the World Wide Web at http://www.ietf.org/internet-drafts/draft-ietf-mobileip-hmipv6-08.txt and incorporated in its entirety herein by reference. The Internet Draft by Soliman et al. discloses a Mobility Anchor Point (MAP) within an IPv6 network that implements HMIPv6 by assigning a regional care-of address to mobile nodes within its address realm. Mobile nodes may thus use on-link care-of addresses for communications within the address realm of the MAP, and the regional care-of address for IPv6 communications outside the MAP address realm. As such, the MAP serves as a local home agent.

Hence, a mobile node is always addressable by its "home address": packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications. As apparent from the foregoing, however, Soliman et al. is limited to mobile nodes, and does not describe use of HMIP for a mobile router in a manner that could be applied to a mobile network served by the mobile router. However, route optimization has been described in the Internet Draft by Ohnishi et al., "HMIP based Route Optimization Method in a Mobile Network" available at the IETF website at http://www.ietf.org/internet-drafts/draft-ohnishi-nemo-ro-hmip-00.txt and the disclosure of which is incorporated in its entirety herein by reference.

Of particular interest is a proposal that describes using prefix delegation, such as Dynamic Host Configuration Protocol (DHCP): DHCP is described in Droms et al., "Dynamic Host Configuration Protocol for IPv6 (DHCPv6)", published by the IETF as a Request for Comments (RFC) 3315 and available on the World Wide Web at http://www.ietf.org/rfc/rfc3315.txt (the disclosure of which is incorporated in its entirety herein by reference). Prefix delegation in DHCP is described in Troan et al., "IPv6 Prefix Options for Dynamic Host Configuration Protocol (DHCP) version 6", published by the IETF as RFC 3633 and available at the IETF website at http://www.ietf.org/rfc/rfc3633.txt (the disclosure of which is incorporated in its entirety herein by reference).

In particular, the Internet Draft by Lee et al., "Route Optimization for Mobile Nodes in Mobile Network based on Prefix Delegation", available at the IETF website at http://www.ietf.org/internet-drafts/draft-leekj-nemo-ro-pd-02.txt (the disclosure of which is incorporated in its entirety herein by reference) discloses an access router that delegates a prefix to a top level mobile router.

FIGS. 1 and 2 are diagrams from the above-incorporated Internet Draft by Lee et al. FIG. 1 illustrates a network 10 having mobile routers 12a and 12b attached to their respective home agents 14a and 14b. The home agents 14a and 14b each provide a point of attachment in FIG. 1 between the respective mobile routers 12a and 12b and the Internet 16, enabling the mobile nodes 18 to communicate with a correspondent node 20. Each of the home agents 14a and 14b has a corresponding home address prefix: the home agent "HA-MR1" 14a has a home address prefix 22a of "1::", and the home agent "HA-MR2" 14b has a home address prefix 22b of "2::", according to the IPv6 addressing convention specified in RFC 3513, available on the Internet at http://www.ietf.org/rfc/rfc3513.txt (the disclosure of which is incorporated in its entirety herein by reference). Hence, the mobile routers "MR1" 12a and "MR2" 12b are assigned by their respective home agents 14a and 14b the mobile network prefixes 24a and 24b having respective values "1:1::" and "2:1::". Consequently, the mobile routers 12a and 12b advertise their respective mobile network prefixes 24a and 24b to their respective attached nodes 18 and consequently form mobile networks 30a and 30b. FIG. 1 also illustrates an access router 26 having a corresponding local network 42, also referred to herein as a visited network, having a network prefix 28 with a value of "3::".

FIG. 2 illustrates a revised network topology 10' based on the movement of the mobile routers 12a and 12b from their respective home agents 14a and 14b and attachment with the access router 26. As shown in FIG. 2, each mobile router (e.g., 12a and 12b) has a home address (HoA) (e.g., 34a, 34b) based on its corresponding home address prefix (e.g., 22a, 22b): the home address 34a of the mobile router (MR1) 12a has a value of "1::1" within the address space of the home address prefix 22a "1::", and the home address 34b of the mobile router (MR2) 12b has a value of "2::3" within the address space of the home address prefix 22b "2::".

According to the Internet Draft by Lee et al., the mobile router 12a detects movement and obtains a delegated prefix (DP) 32a having a value of "3:1::" from the access router 26 according to a prefix delegation protocol such as DHCPv6. The detection of movement by the mobile router 12a is based on, for example, a detected loss of connectivity with the home agent 14a, detecting router advertisement messages from the access router 26, and attaching to the access router 26. In response to receiving the delegated prefix 32a, the mobile router 12a builds a care-of address (CoA) 36a within the network prefix 28, and performs a binding update with its home agent 14a to enable the home agent 14a to identify that the home address 34a of the mobile router 12a is reachable via the care-of address 36a.

In response to assignment of the delegated prefix 32a, the mobile router 12a also outputs router advertisement messages that advertise the delegated prefix 32a, using a prescribed Delegated Prefix option. Note that the mobile router 12a also outputs router advertisement messages that advertise its mobile network prefix 24a. The second mobile router (MR2) 12b in response attaches to the mobile router 12a, and obtains from the mobile router 12a a sub-delegated prefix 32b having a value of "3:1:1::" and that is within the address space of the delegated prefix 32a "3:1::" assigned to the mobile router 12a.

The mobile router 12b, having attached to the mobile router 12a, obtains a care-of address (CoA2) 36b based on the mobile network prefix 24a (based on the router advertisement message specifying the MNP 24a) and a care-of address (CoA1) 36c based on the delegated prefix 32a (based on the router advertisement message specifying the DP 32a). The mobile router 12b selects the care-of address 36c, performs a binding update to notify the home agent 14b of the care-of address 36c, and advertises its sub-delegated prefix 32b to the attached nodes 18 which in response establish their own respective care-of addresses 36d and 36e. Also note that the visiting mobile node attached to the mobile router 12b also builds a care-of address 36f ("2:1::9") based on a router advertisement message from the mobile router 12b that specifies the MNP 24b.

However, the prefix delegation by the mobile router 12a in FIG. 2 suffers from the disadvantage that restricting the sub-delegated prefix 32b to within the address space of the delegated prefix 32a of the mobile router 12a limits the flexibility by the mobile router 12b to move within the visited network 42 having the access router 26 as a point of attachment to the Internet 16. In particular, the prefix delegation by the mobile router 12a fails to provide inner mobility in the nested network topology 40 below the mobile router 12a: if any mobile router (e.g., 12a, 12b) changes its point of attachment within the visited network 42 provided by the access router 26, the mobile router must renumber all of its delegated prefixes.

Consider the example that mobile router 12b changes its attachment from the mobile router 12a to the access router 26: the mobile router 12b would need to discontinue use of the subdelegated prefix 32b because it conflicts with the delegated prefix 32a assigned to the mobile router 12a. Hence, the mobile router 12b would need to obtain a new delegated prefix (e.g., "3:2::") from the access router 26. In addition, once the mobile router 12b determined that it was no longer attached to the mobile router 12a, the mobile router 12b would need to advertise its mobile network prefix 24b to maintain connectivity within its mobile network 30b, since the delegated prefixes 32a and 32b were no longer valid (reachable) prefixes. Hence, unknown visiting mobile nodes could build the care-of address 36f based on the MNP 24b, possibly revealing the identity of the mobile router 12b to an unknown visiting mobile node.

Moreover, assuming the mobile router 12a changed its attachment from the access router 26 to the mobile router 12b which is now attached to the access router 26, the mobile router 12a would need to discontinue use of its delegated prefix 32a because it is outside the address space of the new delegated prefix ("3:2::") of the mobile router 12b.

Further, the mobile routers 12a and 12b need to repeat the binding updates with their respective home agents 14a and 14b for each attachment because the prior delegated prefixes are no longer usable within the revised network topology.

SUMMARY OF THE INVENTION

There is a need for an arrangement that enables mobile routers to move transparently within a visited network having an access router configured for assigning delegated prefixes to attached mobile routers, without the necessity of reassignment of address prefixes and resulting binding updates with home agents.

There also is a need for an arrangement that enables mobile routers within a visited mobile network to provide added security and anonymity by advertising delegated prefixes to visiting mobile nodes, without the need for advertising their mobile network prefixes that are associated with their respective home networks.

These and other needs are attained by the present invention, where an access router of a local mobile network includes a delegation resource for delegating address prefixes and a routing resource configured for parsing reverse routing headers from received data packets. The delegation resource supplies each mobile router attaching to the local mobile network with a corresponding unique delegated address prefix within an available network prefix for use within the local mobile network. Each mobile router attached to the access router via another mobile router utilizes a reverse routing header to establish a tunnel with the access router, enabling the access router to source route messages to the mobile router via its corresponding local care-of address and next-hop addresses specified in the reverse routing header. Each mobile router creates a remote care-of address based on the delegated address prefix, minimizing the need for binding updates with the corresponding home agent as the mobile router moves within the local mobile network. Moreover, the mobile router can advertise the delegated prefix to other mobile nodes, while maintaining confidentiality of its home network prefix, as well as the confidentiality of visiting mobile nodes that attach to the mobile router by using the delegated prefix for a care-of address.

One aspect of the present invention provides a method in an access router. The method includes supplying to a first mobile router a delegated address prefix, based on attachment by the first mobile router to one of the access router and a second mobile router attached to the access router. Each mobile router in a local mobile network serviced by the access router receives a corresponding unique delegated address prefix for use within the local mobile network. The method also includes registering a remote care-of address having delegated address prefix with a prescribed home agent of the first mobile router, to register a reachability of the first mobile router. The unique delegated address prefix enables each mobile router to use the delegated address prefix as the mobile router moves through the local mobile network, regardless of whether the mobile router changes its point of attachment. The unique delegated address prefix also enables the access router to establish respective security and traffic policies for the corresponding mobile router. In addition, the registration of the remote care-of address having the delegated address prefix enables the home agent to maintain connectivity with the first mobile router, since the access router will maintain reachability information for the delegated address prefix as the first mobile router moves throughout the local mobile network.

Another aspect of the present invention provides a method in a mobile router. The method includes detecting a router advertisement message output by a second mobile router serving as an attachment router for the mobile router. The router advertisement message has a prefix option and a tree information option, the prefix option specifying a first network prefix for use within a local mobile network serviced by the second mobile router, the tree information option specifying an access router as a top level router and that is configured as a delegating router for supplying delegated address prefixes. The method also includes generating a local care-of address based on the first network prefix, and outputting a request for a delegated prefix from the access router via the second mobile router. The delegated prefix assigned by the access router is received, wherein the delegated prefix is distinct from the first network prefix. The method also includes advertising the delegated prefix on ingress links of the mobile router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
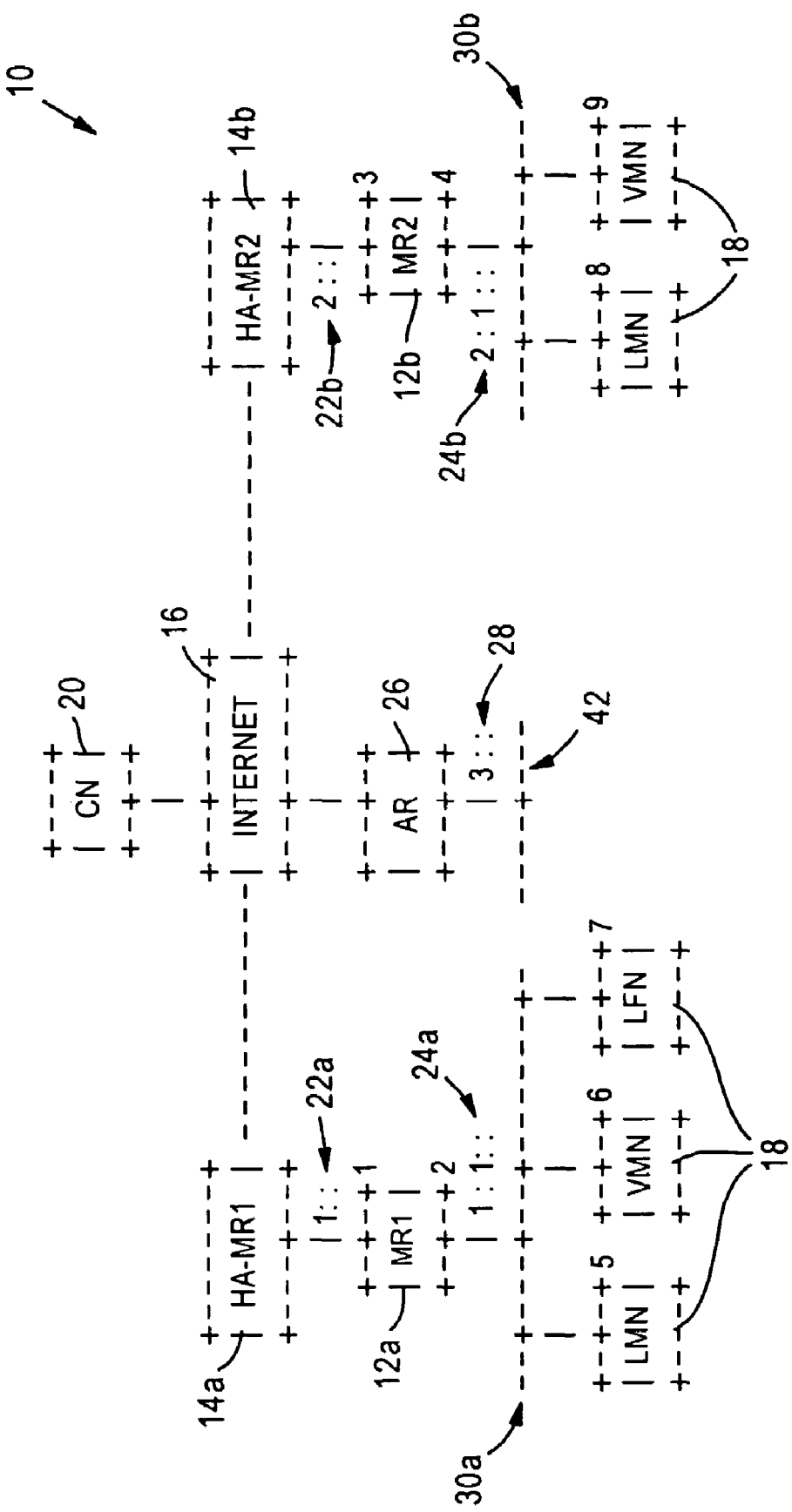
FIG. 1 is a (PRIOR ART) diagram illustrating a network topology of mobile routers within respective home networks.
Figure 2:
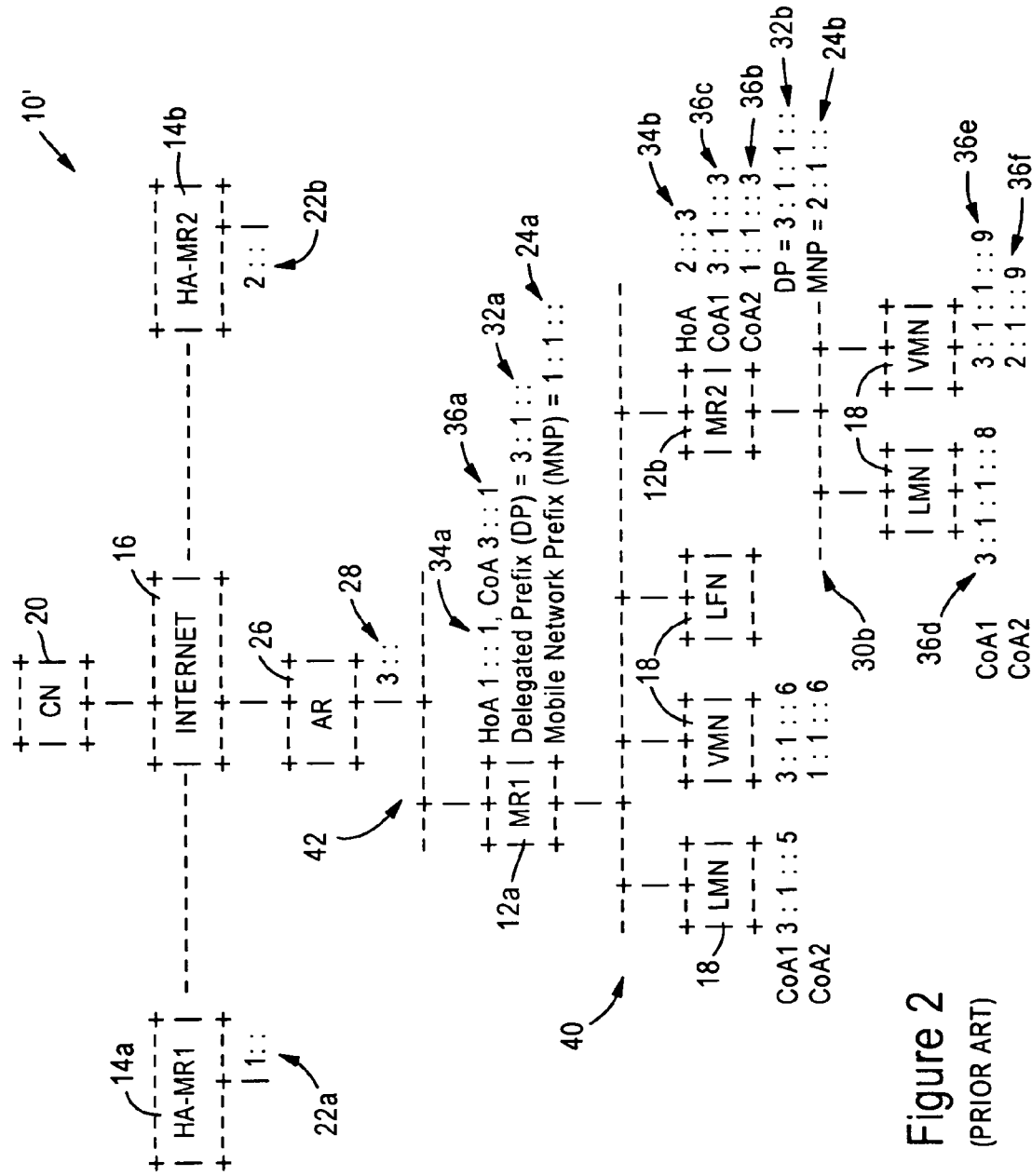
FIG. 2 is a (PRIOR ART) diagram illustrating a network topology of nested mobile routers with nested prefixes in a visited network.
Figure 3A:
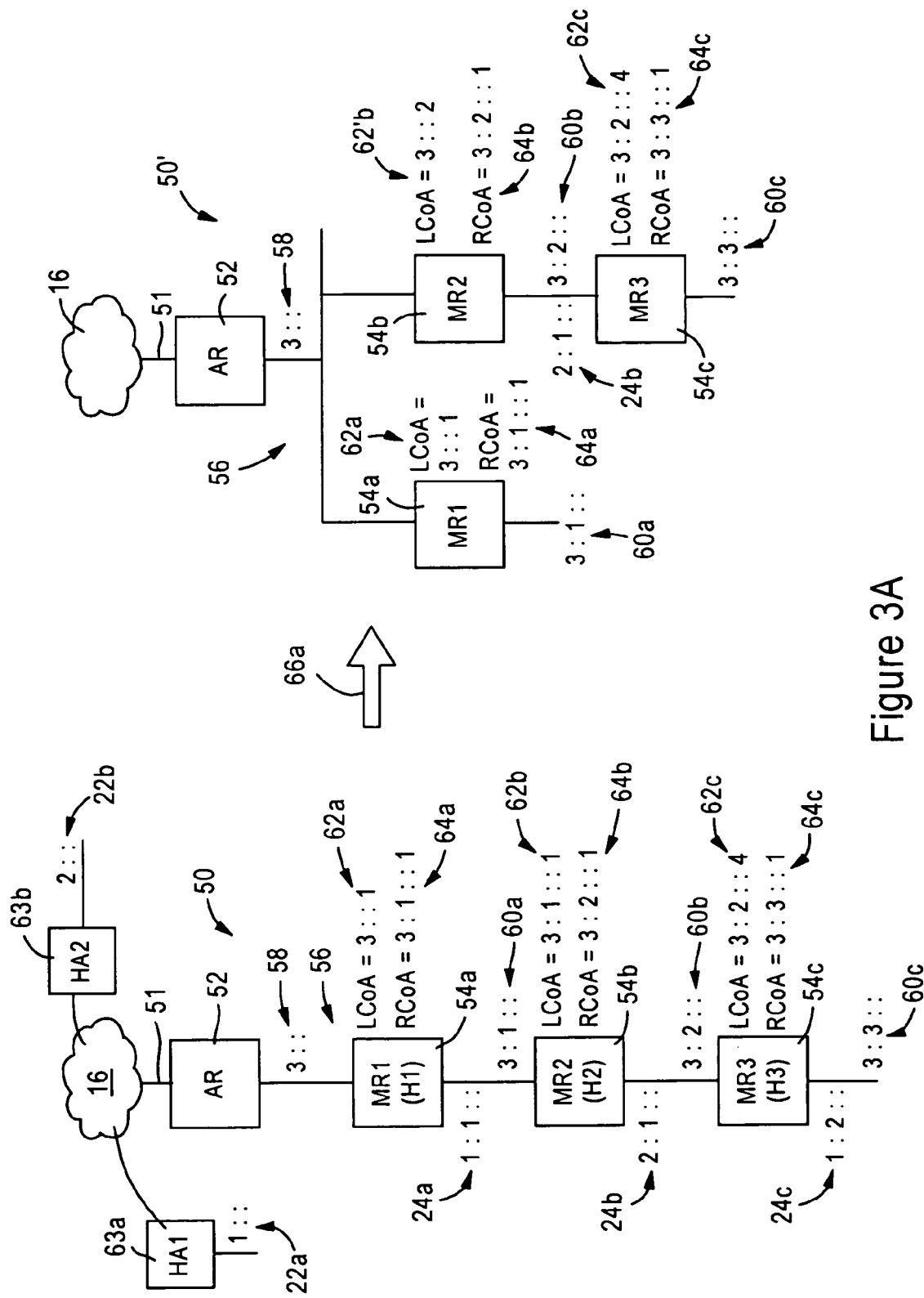
FIGS. 3A and 3B are diagrams illustrating mobile routers having continuous delegated prefixes while moving within a visited network, based on assignment thereof by the access router serving as an attachment point in the visited network, according to an embodiment of the present invention.
Figure 3B:
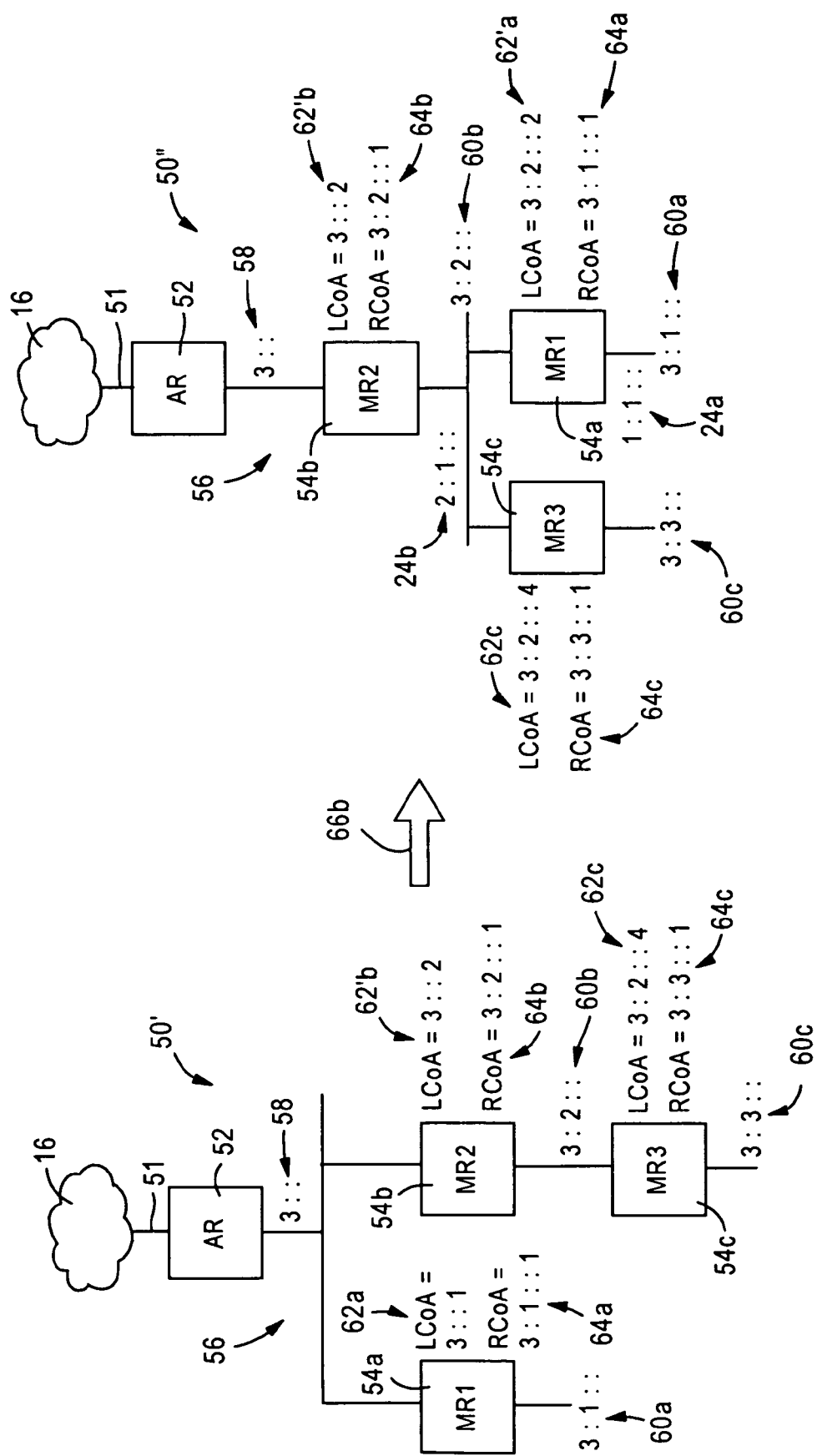

FIGS. 3A and 3B are diagrams illustrating network topologies 50, 50' and 50" based on an access router (AR) 52 providing connectivity for roaming mobile routers 54a, 54b, and 54c in a local mobile network 56 to a wide area network 16 via a fixed connection 51, according to an embodiment of the present invention. The access router 52 is configured to perform NEMO based operations and as described below. In particular, the access router 52 selects an available network prefix 58 (e.g., "3::") for use by mobile routers 54a, 54b, and 54c. Note that the access 52 actually may have other network prefixes that it reserves for wired networks, private networks, or the like.

The access router 52 outputs a router advertisement message that includes a prefix option that specifies an available network prefix 58 (e.g., "3::") for the mobile routers 54a, 54b, and 54c to use as a point of attachment, as well as a tree information option. The access router 52 also advertises to the wide area network 16 that the available network prefix 58 having a value of "3::" is globally reachable via the access router 52.

The mobile router 54a attaches to the access router 52 based on the advertisement message specifying the available network prefix 58 and the tree information option. In response to the mobile router 54a receiving a delegated prefix 60a (e.g., "3:1::"), the mobile router 54a outputs a router advertisement message specifying a prefix option that specifies the delegated prefix 60a, and a tree information option specifying the tree established by the access router 52 and the relative depth of the tree based on attachment to the mobile router 54a. In response, the mobile router 54b attaches to the mobile router 54a, and obtains its own delegated prefix 60b from the access router 52.

FIG. 3A also illustrates a transition 66a in the topology 50 of the local mobile network 56 to the topology 50' in response to the mobile router 54b attaching from the mobile router 54a to the access router 52. FIG. 3B illustrates a transition 66b in the topology 50' of the local mobile network 56 to the topology 50" in response to the mobile router 54a attaching from the access router 52 to the mobile router 54b.

As described below, the access router 52 is configured for assigning to each mobile router 54a, 54b, and 54c a corresponding unique delegated address prefix 60a, 60b, and 60c upon initial registration with the access router 52, enabling the mobile routers to move throughout the local mobile network 56 without reassignment of delegated address prefixes. The delegated prefixes 60a, 60b, and 60c are selected from an aggregation of the available network prefix 58 of the access router. Hence, the delegated prefixes 60a, 60b, and 60c having respective values "3:1::", "3:2::", and "3:3 ::" are within the address space of the available network prefix 58 having the value of "3::".

Further, the access router 52 is configured for serving as a Mobile IP home agent that Supports reverse routing header operations, enabling the mobile routers 12a, 12b, and 12c to register their local care-of addresses (LCoA) 62a, 62b, and 62c having values "3::1", "3:1::1", and "3:2::4 " with the access router 52 using respective tunnels. Each of the tunnels also may have a corresponding security association, enabling the access router 52 and the corresponding mobile router 54a, 54b or 54c to maintain privacy. Note that since the mobile router 54a shares a link with the access router 52 (i.e., is directly connected to the access router 52), use of the reverse routing header is optional, although a tunnel having a security association still may be used.

Hence, the access router 52 can maintain a binding cache that specifies, for each mobile router, the delegated network prefix (e.g., 60a, 60b, 60c), the local care-of address (e.g., 62a, 62b, and 62c), and a source-route header that specifies a hop-by-hop path to the corresponding local care-of address.

As illustrated in FIGS. 3A and 3B, each mobile router 54a, 54b, and 54c also retains its corresponding original mobile network prefix 24a, 24b, 24c (i.e., native mobile network prefix) having been assigned by its corresponding home agent 63. For example, the mobile router 54a (MR1) and the mobile router 54c (MR3) have respective native mobile network prefixes 24a ("1:1::") and 24c ("1:2::") assigned by the home agent 63a (HA1) having the corresponding home prefix 22a ("1::"); the mobile router 54b (MR2) has the native mobile network prefixes 24b ("2:1::") assigned by the home agent 63b (HA2) having the corresponding home prefix 22b ("2::").

However, the assignment of a delegated network prefix (e.g., 60a, 60b, 60c) enables the mobile router (e.g., 54a, 54b, 54c) to establish and maintain a mobile network using its corresponding delegated network prefix (e.g., 60a, 60b, 60c), eliminating the necessity of the mobile router (e.g., 54a, 54b, 54c) advertising its native mobile network prefix (e.g., 24, 24b, 24c).

Further, each of the mobile routers 54a, 54b, and 54c are configured for selecting a corresponding home care-of address (also referred to as a remote care-of address (RCoA)) 64a, 64b, and 64c from its corresponding delegated prefix 60a, 60b, and 60c. Once the mobile routers 54a, 54b, and 54c select respective home care-of address 64a, 64b, and 64c, the mobile routers can send binding updates to their respective home agents (e.g., 63a or 63b), specifying that the mobile routers (identifiable by their respective home addresses H1, H2, H3) are reachable via their respective remote care-of addresses 64a, 64b, and 64c. The mobile routers 54a, 54b, and 54c also can send binding update messages specifying that their respective native mobile network prefixes 24a, 24b, and 24c are reachable via the respective remote care-of addresses 64a, 64b, and 64c.

The home agent in response updates its binding cache entries to specify that the home addresses (e.g., H1, H2, H3) of the mobile routers 54a, 54b, and 54c, as well as their respective native mobile network prefixes 24a, 24b, and 24c, are reachable via the respective remote care-of addresses 64a, 64b, and 64c within the respective delegated prefixes 60a, 60b, and 60c. Since each delegated prefix is within the available network prefix 58 of the access router 52 that is advertised on the Internet 16, a home agent (e.g., 63a or 63b) can maintain reachability with its mobile router (e.g., 54a, 54b, 54c) via the corresponding home care-of address (64a, 64b, 64c). Hence, the home agent (e.g., 63a or 63b) can forward packets destined to the home addresses (e.g., H1, H2, H3) to the remote care-of addresses 64a, 64b, and 64c via the access router 52.

The access router 52 maintains a binding cache of the delegated prefix (e.g., 60a, 60b, 60c) based on the corresponding local care-of address (e.g., 62a, 62b, 62c). Each mobile router (e.g., 54a, 54b, 54c) sends a binding cache update message to the access router in response to establishing a new attachment point in the local mobile network 56, specifying that the mobile router (e.g., 54a, 54b, and 54c) and its corresponding delegated network prefix (e.g., 60a, 60b and 60c) are reachable via the local care-of address (LCoA) (e.g., 62a, 62b, 62'b, 62c in FIG. 3A; 62a, 62'a, 62'b, 62c in FIG. 3B) established based on the new attachment point.

Hence, the access router 52 provides reachability for each mobile router (e.g., 54a, 54b, 54c), by forwarding packets received via the Internet 16 and destined either to the mobile router based on its home care-of address (e.g., 64a, 64b, 64c) or destined to its corresponding native mobile network prefix (e.g., 24a, 24b, 24c), based on updating its binding cache entries specifying the local care-of addresses (e.g., 62a, 62b, 62c).

For example, FIG. 3A illustrates that the mobile router 54b moves from the mobile router 54a and attaches directly to the access router 52, resulting in the topology 50'. The mobile router 54b attaches to the access router 52 by creating a new care-of address 62'b, having a value of "3::2", based on detecting a router advertisement message from the access router 52 that specifies the available network prefix 58 "3::". The mobile router 54b sends a binding update message to the access router 52 to notify the access router 52 of the new local care-of address 62'b that supersedes the original care-of address 62b. However, the remote care-of address 64b is unchanged because the mobile router 54b continues to use its delegated address prefix 60b.

Similarly, FIG. 3B illustrates that the mobile router 54a moves from the access router 52 and attaches to the mobile router 54b, resulting in the topology 50". The mobile router 54a attaches to the mobile router 54b by creating a new care-of address 62'a, having a value of "3:2::2", based on detecting a router advertisement message from the mobile router 54b that specifies the delegated network prefix 60b available from the mobile router 54b is "3:2::". The mobile router 54a sends a binding update message to the access router 52 to notify the access router 52 of the new local care-of address 62'a that supersedes the original care-of address 62a. However, the remote care-of address 64a is unchanged because the mobile router 54a continues to use its delegated address prefix 60a.

Hence, the necessity for sending binding updates to the home agent (e.g., 63a or 63b) for registration of a remote care-of address (e.g., 64a, 64b, 64c) for a corresponding a mobile router (e.g., 54a, 54b, and 54c), needs only be performed once for the duration that the mobile router is roaming within the local mobile network 56, regardless of whether changes in the topology are encountered as illustrated in FIGS. 3A and 3B.

Figure 4:
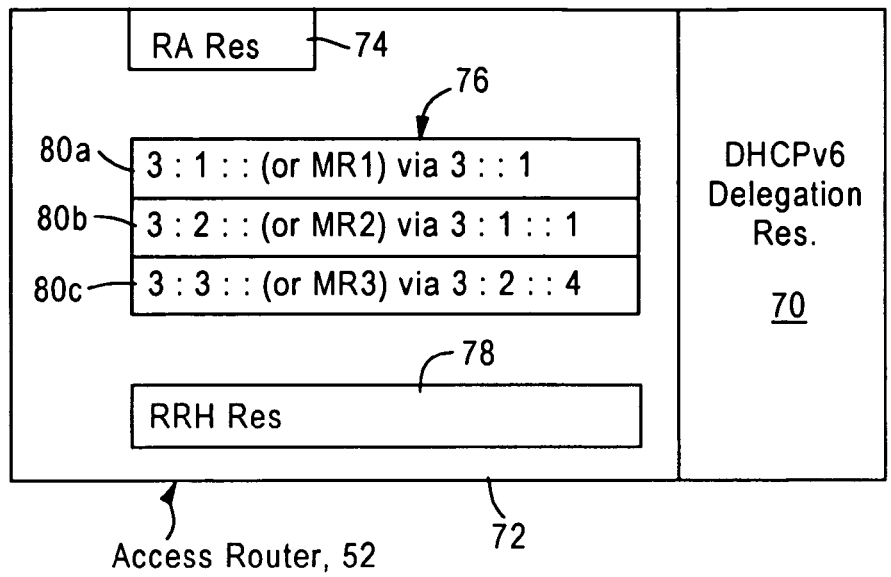
FIG. 4 is a diagram illustrating in detail the access router of FIGS. 3A and 3B, according to an embodiment of the present invention.

FIG. 4 is a block diagram illustrating the access router 52, according to an embodiment of the present invention. The access router 52 includes a DHCPv6 delegation resource 70 configured for delegating prefixes as described in the above-incorporated Internet Draft by Troan et al. As described below, the delegation resource 70 is configured for supplying to each mobile router (e.g., 54a, 54b, 54c) a corresponding delegated address prefix (e.g., 60a, 60b, and 60c), wherein each of the delegated address prefixes (e.g., 60a, 60b, and 60c) are within the address space of the available network prefix 58, enabling the delegated address prefixes to be used throughout the local mobile network 56.

The access router 52 also includes a routing resource 72 that includes a router advertisement resource 74, a routing table 76, and a reverse routing header (RRH) resource 70. The routing table is configured for storing a plurality of binding cache entries 80. Each binding cache entry (e.g., 80a, 80b, 80c) is configured for storing the corresponding local care-of address (e.g., 62a, 62b, 62c) for a corresponding delegated address prefix (e.g., 60a, 60b, and 60c), or the corresponding mobile router (e.g., 54a, 54b, 54c). It is apparent, however, that separate entries may be stored for each mobile router and each delegated prefix 80, depending on implementation of the routing table 76.

The reverse routing header resource 78 is configured for providing reverse routing header functionality, and serving as a tunnel endpoint to terminate a tunnel with a mobile router, as described in the above incorporated Thubert-RRH Internet Draft. In particular, the reverse routing header resource 78 is configured for establishing a source route for reaching a corresponding local care-of address 62 based on successive next-hop addresses specified within the reverse routing header of the received message. The reverse routing header is described below with respect to FIG. 7.

Figure 5:
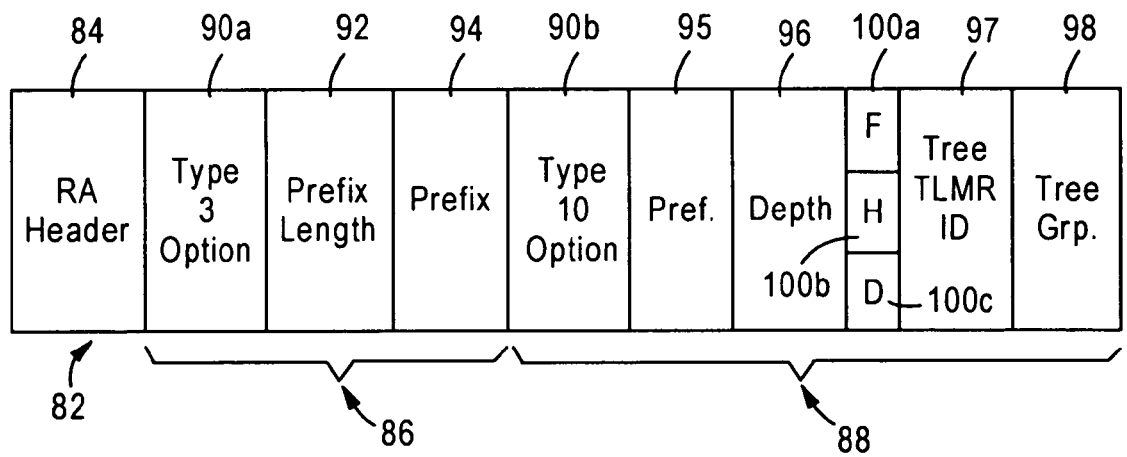
FIG. 5 is a diagram illustrating in detail a router advertisement message output by the access router, and an attached mobile router of FIGS. 3A and 3B, according to an embodiment of the present invention.

FIG. 5 is a diagram illustrating the router advertisement message 82 output by the router advertisement resource 74, according to an embodiment of the present invention. The router advertisement message 82 includes a mandatory router advertisement portion 84 in accordance with RFC 2461, entitled "Neighbor Discovery for IP Version 6 (IPv6)", available on the IETF website at http://www.ietf.org/rfc/rfc2461.txt and incorporated in its entirety herein by reference. The router advertisement message 82 also includes a prefix option portion 86 in accordance with Section 4.6.2 of RFC 2461, and a tree information option portion 88 in accordance with the above-incorporated Thubert-RRH Internet Draft.

The prefix option portion 86 includes an option type field 90a ("3"), a prefix length field 92 that specifies the valid length of the available prefix 58, and a prefix value 94 having a 128-bit IPv6 address, of which the most significant bits as specified in the prefix length field 92 are valid.

The tree information option field 88 is used to identify characteristics of the tree formed by the access router 52 acting as a top level mobile router. In particular, the tree information option field 88 includes an option type field 90b ("10"), a preference field 95 specifying a prescribed preference value for the corresponding tree, a depth field 96 specifying the number of hops to the top-level mobile router (TLMR) specified in the TLMR field 97, a tree group field 98, and flag bits 100a, 100b, and 100c. The TLMR field 97 specifies the global IPv6 address of the router (e.g., 52, 54a, 54b, 54c) transmitting the router advertisement message 82. The tree group field 98 specifies an IPv6 global address (set by the TLMR 52) that is used to identify the tree (e.g, the network topology 50 includes a single tree based on the sequential connection of routers 54c to 54b to 54a to 53).

The flag bit 100a (F=1) is used to specify that the access router 52 is a fixed mobile router. The flag bit 100b (H=1) is used to specify that the access router 52 acts as a home agent, and the flag bit 100a (D=1) is used to specify that the access router 52 is configured to operate as a delegating router (DR) configured for performing prefix delegation (PD) according to DHCPv6 protocol. Hence, the access router 52 advertises itself as a DHCPv6 delegating router for prefix delegation (DHCPv6-PD DR).

Figure 6:
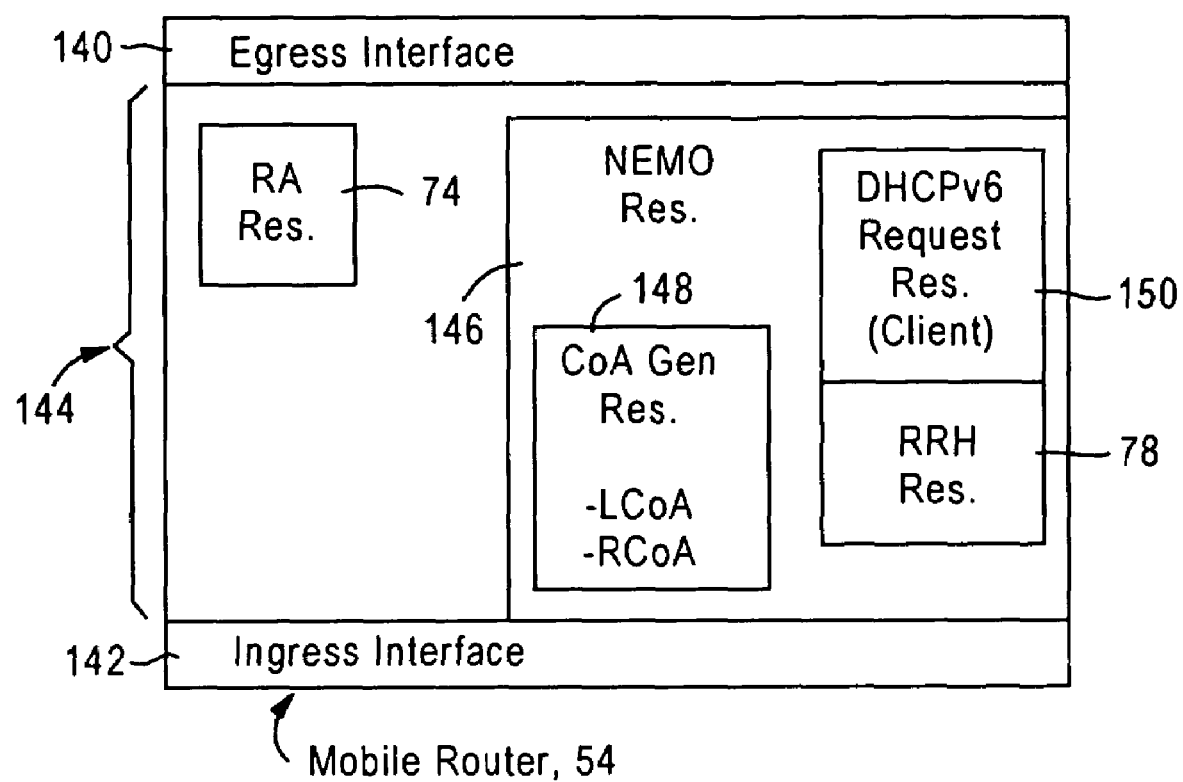
FIG. 6 is a diagram illustrating in detail one of the mobile routers of FIGS. 3A and 3B, according to an embodiment of the present invention.

FIG. 6 is a diagram illustrating the mobile router 54, according to an embodiment of the present invention. The mobile router 54 includes an egress interface 140, an ingress interface 142, and a routing resource 144 that includes a router advertisement resource 74 and a mobility (NEMO) resource 146. The ingress interface 142 is configured for receiving data traffic from attached nodes, and forwarding the traffic to the Internet 16 via the egress interface 140, based on attachment to the access router 52 and any other intermediate routers. The ingress interface 142 also is configured for outputting router advertisement messages 82 generated by the router advertisement resource 74.

The mobility resource 146 includes a care of address generation resource 148, a reverse routing header resource 78, and a DHCPv6 compliant prefix request resource 150, that serves as a DHCPv6 client that interacts with the DHCPv6 delegation resource 70 according to RFC 3633. Additional details will be described below.

Figure 7:
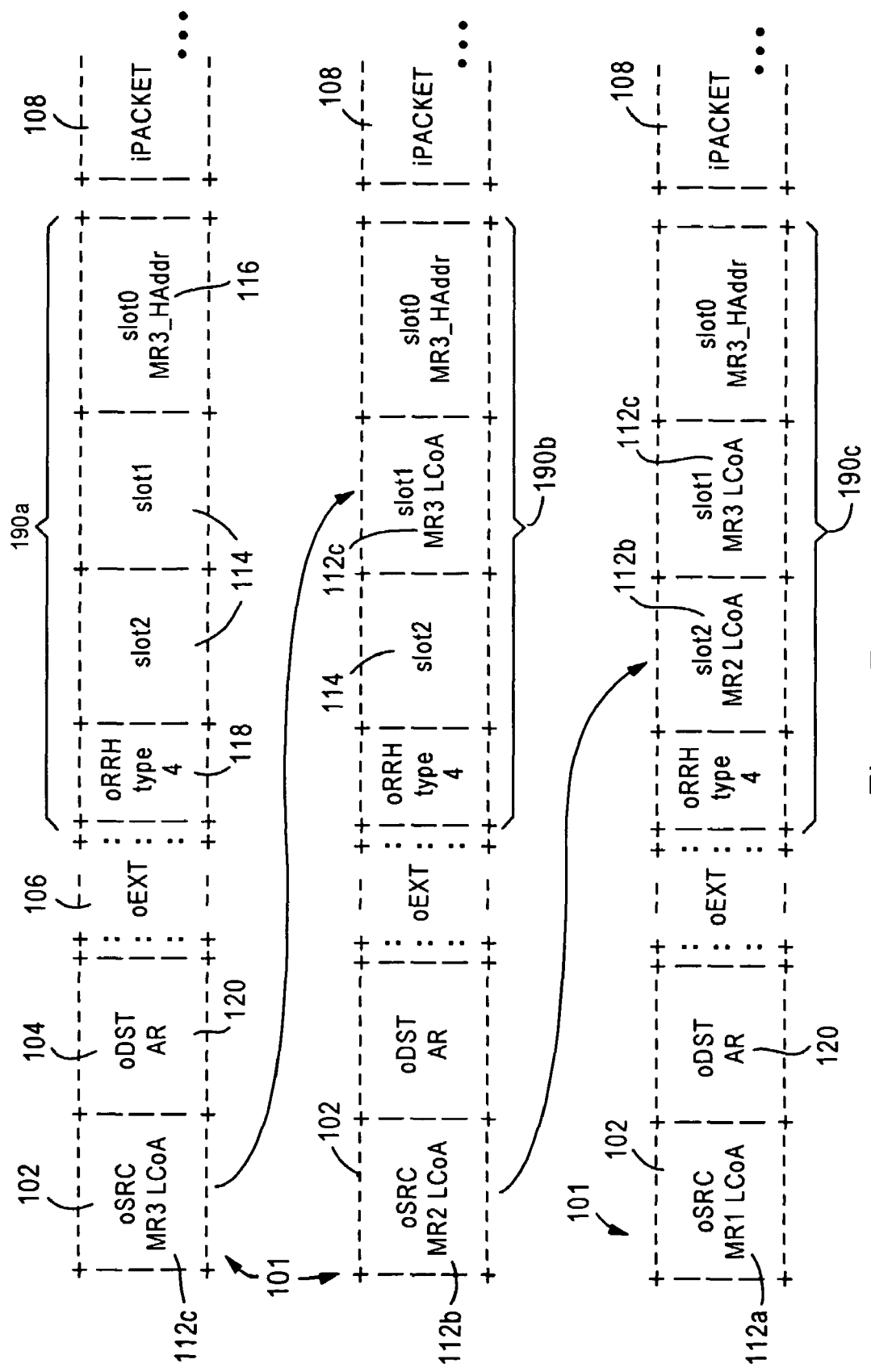
FIG. 7 is a diagram illustrating processing of the reverse routing header by the mobile routers of FIGS. 3A and 3B, according to an embodiment of the present invention.

FIG. 7 is a diagram illustrating a reverse routing header generated by the RRH resource 78 in the mobile routers, in accordance with the above-incorporated Thubert-RRH draft. In particular, FIG. 7 illustrates updating of a reverse routing header 190a, 190b, and 190c by the originating mobile router 54c, the intermediate mobile router 54b, and the mobile router 54a, respectively, having the topology 50. In particular, FIG. 7 illustrates a packet 101 having a source address field 102, a destination address field 104, extended headers 106, a reverse routing header (e.g., 190a) and an inner packet 108 (e.g., a request for a delegated address prefix) having been generated by an originating source, for example the mobile router 54c As described in the above incorporated Thubert-RRH, the mobile router 54c, as the originating mobile router, outputs the packet 101 having the source address field 102 specifying the care of address 112c (MR3LCoA) of the mobile router 54c, and a selected number of empty address slots 114 within the reverse routing header 190a. The empty slots enable the routers 54b and 54a to store their respective care of addresses within the IPv6 header (e.g., within the reverse routing header or the source address field 102).

In particular, the RRH resource 78 of the mobile router 54c the resource 43 inserts a prescribed home address 116 (MR3_HAddr) (or an alias for anonymous connections) for the mobile router 54c in the first slot (slot0), and specifies a routing header of type "4" within a type field 118. The RRH resource 78 inserts the care of address 112c of the mobile router 54c in the source address field 102, and the address 120 (AR) of the corresponding access router 52 in the destination address field 104, and outputs the packet 101 to its attachment router 54b.

The mobile router 54b, in response to detecting the reverse routing header 190a, selectively updates the reverse routing header by inserting the source address value 112c into the detected empty entry field "slot1", resulting in the updated reverse routing header 190b. The mobile router 54b inserts its own care of address 112b into the source address field 102, and outputs the packet to its attachment router 54a.

The mobile router 54a, in response to detecting the reverse routing header 190b, selectively updates the reverse routing header by inserting the source address value 112b into the detected empty entry field "slot2", resulting in the updated reverse routing header 190c. The mobile router 54a inserts its own care of address 112a into the source address field 102, and outputs the packet to the access router 52. Hence, the reverse routing header provides a tunnel between the originating mobile router (e.g., 54c) and the access router 52.

The access router 52 reads the bottom entry 116 to identify the home address of the mobile router 54c, using the entry as if it was a mobile IPv6 home address destination option (i.e., as an index into the binding cache). The access router 52 now can send a packet directly back via the tunnel by using the reverse routing header 190c and the source address 102 in building the source routing header.

Figure 8A:
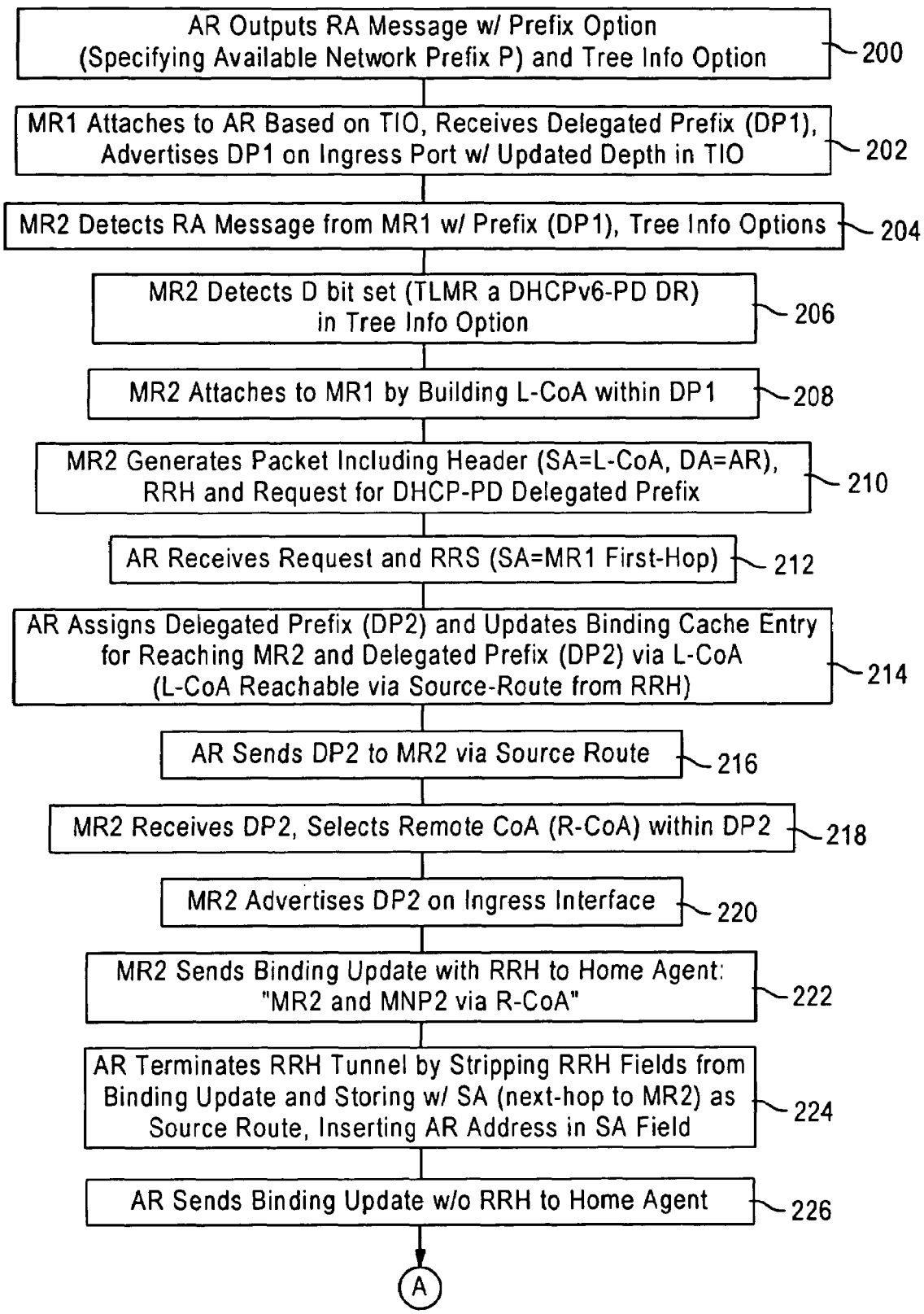
FIGS. 8A and 8B are diagrams illustrating the methods by the access router and the mobile routers of FIGS. 3A and 3B of establishing unique delegated prefixes for each of the mobile routers, according to an embodiment of the present invention.
Figure 8B:
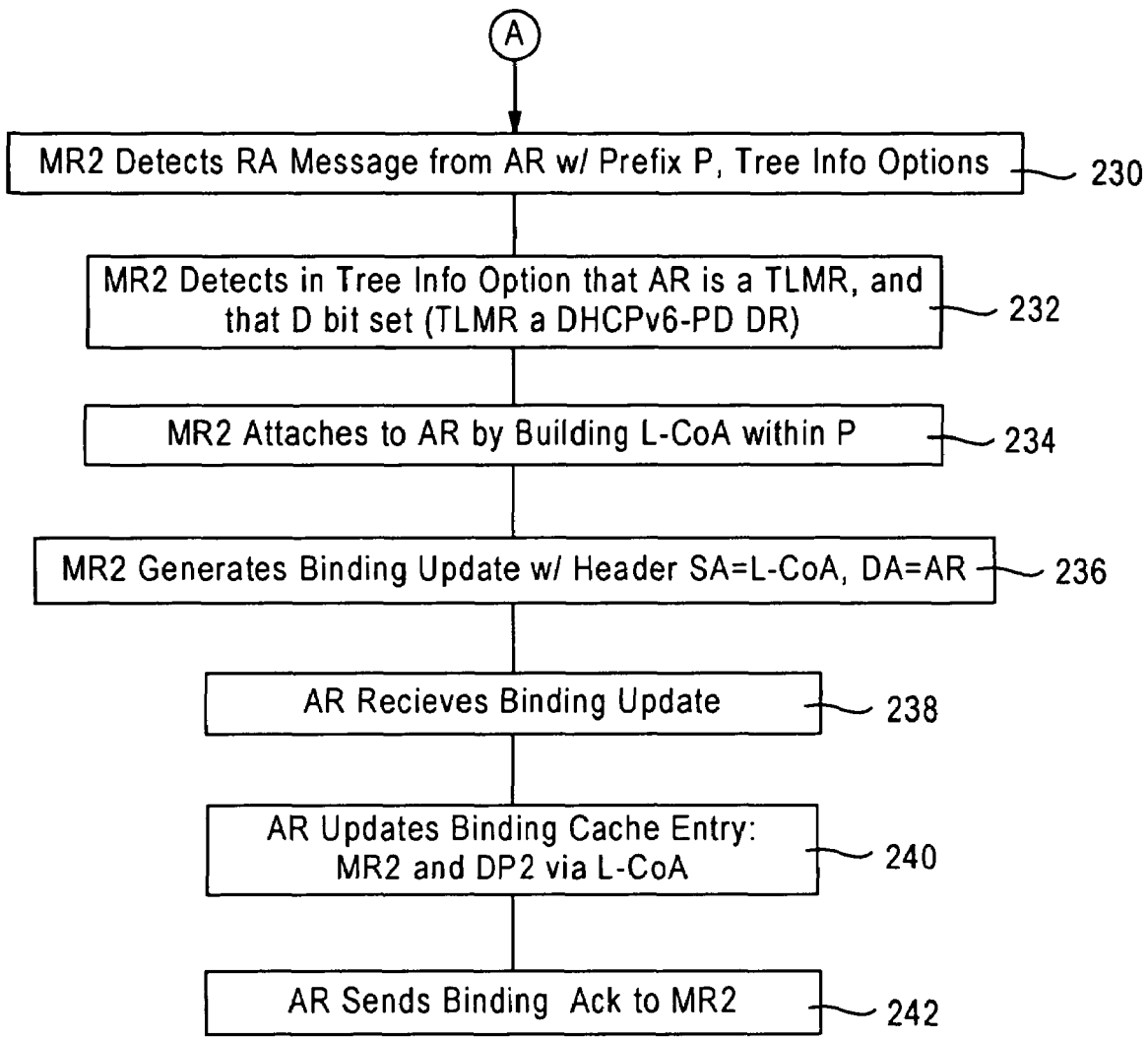

FIGS. 8A and 8B are diagrams illustrating delegation of address prefix is by the access router 52 to the mobile routers 54, according to an embodiment of the present invention. The steps described herein with respect to FIGS. 8A and 8B can be implemented in the respective mobile nodes as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 200, where the router advertisement resource 74 of the access router 52 outputs a router advertisement message including a prefix option 86 specifying the available network prefix (P) 58 having a value of "3::" and a tree information option 88 specifying that the access router 52 is a NEMO capable fixed top level mobile router (TLMR) capable of prefix delegation. In response to detecting the router advertisement message, the mobile router 54a attaches in step 202 to the access router 52 by configuring its local care of address 62a based on the advertised prefix 58, sending a request to the access router 52 for a delegated prefix (DPI) 60a, and upon receipt thereof, advertising the delegated prefix 60a on its ingress port 142. In particular, the router advertisement message 82 output by the mobile router 54a specifies the delegated prefix 60a in the prefix portion 94 of the prefix option 86, with the appropriate prefix length specified in the length field 92; the tree information option 88 is identical to the tree information option output by the access router 52, except that the mobile router 54a increments the depth field 96 by "1" indicating the mobile router 54a is one hop away from the TLMR. As described above, the mobile router 54a does not need to the utilize a reverse routing header because it is directly attached to the access router 52. The mobile router 54a also sends a binding update to its home agent 63a (HA1) specifying that the mobile router 54a (identifiable by its home address H1) and/or its corresponding native mobile network prefix 24a ("1:1::") is reachable via the remote care-of address 64a ("3:1::1").

The routing resource 144 of the mobile router 54b detects in step 204 the router advertisement message 82 received by the egress interface 140 from the mobile router 54a, which specifies the delegated prefix 60a, and the tree information options 88. In response to detecting the tree information option 88, the mobility resource 146 parses the tree information option 88 in step 206, and detects that the bit 100c is set indicating that the access router 52, as the top-level mobile router, is configured as a delegating router. In response the care of address generation resource 148 causes the mobile router 54b to the attached to the mobile router

54a in step 208 by building a local care of address 62b based on the delegated prefix 60a (DP1).

The mobile router 54b generates a packet in step 210. The packet includes the DHCPv6 request 108 generated by the request resource 150, and the reverse routing header 190 generated by the RRH resource 78. The routing resource 72 adds its local care of address 62b within the source address field 102, and the address 120 of the access router 52 in the destination address field 104, which was retrieved by the mobility resource 146 from the TLMR identifier 97 in the tree information option field 88.

The delegation resource 70 in the access router 52 receives in step 212 the delegated prefix request and the attached RRH 190. The delegation resource 70 in response assigns in step 214 the delegated prefix 60b (DP2) and updates its binding cache entry 80b to specify that the delegated prefix 60b and the mobile router 54b are reachable via the local care of address 62b; the routing resource 72 also stores the reverse routing header in the form of the source router entry for the local care of address 62b, specifying that the local care of address 62b is reachable via the source route generated from the reverse routing header.

The delegation resource 70 sends in step 216 the delegated prefix 60b to the mobile router 54b using the source route obtained from the reverse routing header.

In response to the DHCPv6 client 150 receiving the delegated prefix 60b, the care of address generation resource 148 selects in step 218 a remote care of address (R-CoA) 64b that is within the address space of the delegated prefix 60b. The router advertisement resource 74 in the mobile router 54b advertises in step 220 the delegated prefix 60b on its ingress interface 142.

The mobility resource 146 of the mobile router 54b uses its internal binding update resource (not shown) to send a binding update with a reverse routing header to its home agent 63b (HA2) in step 222, specifying that the mobile router 54b (identifiable by its home address H2) and/or its corresponding native mobile network prefix 24b (MNP2) having a value of "2:1::" is reachable via the remote care of address 64b. The reverse routing header 78 of the access router 52 terminates the tunnel in step 224 by stripping the reverse routing header fields 190, storing the source route back to the originating mobile router 54b relative to its care of address value 62b specified in the reverse routing header; the access router 52 adds its own address in the source address field 102, and forwards in step 226 the binding update message to the home agent 63b.

FIG. 8B is a diagram illustrating the transition 66a and FIG. 3A, where the mobile router 54b attaches directly to the access router 52. The mobile router 54b detects in step 230 the router advertisement message 82 from the access router 52 specifying the prefix (P) 58, and the tree information options 88. The mobility resource 146 detects in step 232 that the access router 52 is a top-level mobile router, and that the flag bit 100c is set indicating that the access router 52 is a delegating router. The care of address generation resource 148 in the mobile router 54b attaches to the access router 52 in step 234 by generating a new care of address 62'b ("3::2") that is within the address space of the available network prefix 58 advertised by the access router 52. The mobility resource 146 of the mobile router 54b generates a binding update message for the access router 52 in step 236 that specifies the new local care of address 62'b. In response to the routing resource 72 in the access router 52 receiving the binding update message in step 238, the routing resource 72 updates in step 240 the binding cache entry 80b to specify that the mobile router 54b and the delegated prefix 60b are reachable via the new local care of address 62'b having a value of "3::2". The routing resource 72 cents a binding acknowledgment back to the mobile router 54b in step 242.

According to the disclosed embodiment, NEMO route optimization can be applied to roaming mobile routers in a visited network, while conforming to Basic Nemo protocols outside of the nested structure.

In addition, since a mobile router need only advertise the delegated prefix in the clear, privacy can be maintained regarding keeping its home address prefix secret to untrusted access routers or visiting mobile nodes. Hence, the mobile router and the access router (and local mobile nodes) can be anonymous to each other upon implementation of RFC 3041 in each node.

Also, the access router may place the mobile router traffic in specific categories so the visited access router can enforce its own security and prevent the visiting mobile router from over utilizing its resources.

Finally, the long distance registration to the home agent is preserved while the mobile router moves within the local mobile network of the access router, which allows the access router to limit access.

Note that use of reverse routing headers optimizes communications by eliminating nested tunnels between a mobile router and the access router; however, use of reverse routing headers may be omitted at the expense of utilizing nested tunnels.

In addition, it should be readily apparent that the disclosed embodiment is applicable to any number of mobile routers that may attach to the attachment router.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an access router, the method comprising:
supplying to a first mobile router a delegated address prefix, based on attachment by the first mobile router to one of the access router and a second mobile router attached to the access router, each mobile router in a local mobile network serviced by the access router receiving a corresponding unique delegated address prefix for use within the local mobile network; and
registering a remote care-of address having the delegated address prefix with a prescribed home agent of the first mobile router, to register a reachability of the first mobile router.

2. The method of claim 1, further comprising outputting a router advertisement message having a prefix option and a tree information option, the prefix option specifying an available network prefix for use within the local mobile network, the tree information option specifying that the access router is a top level router and configured as a delegating router for supplying the delegated address prefix.

3. The method of claim 2, wherein the supplying step includes:
receiving from the first mobile router a request for the delegated address prefix and that includes a reverse routing header specifying a path to the first mobile router including a local care-of address within an address space of the available network prefix, the request further including a source address field specifying a first hop for the path;

assigning the delegated address prefix to the first mobile router, from an aggregation of prefixes within the available network prefix, by updating a binding cache entry with the delegated address prefix reachable via the local care-of address; and sending to the first hop for the path the delegated address prefix for the first mobile router in a packet including a source route header specifying the path.

4. The method of claim 3, wherein the second mobile router is assigned a second delegated address prefix distinct from the delegated address prefix and within the address space of the available network prefix, the local care-of address within the address space of the second delegated address prefix.

5. The method of claim 4, wherein the registering step includes forwarding a binding update message from the first mobile router to the prescribed home agent, the binding update message specifying at least one of the first mobile router and a native mobile network prefix assigned to the first mobile router by the home agent is reachable via the remote care-of address.

6. The method of claim 5, wherein the forwarding step includes:

removing from the binding update message the reverse routing header, and storing in a binding cache entry that the local care-of address is reachable via the path including the first hop for the path, inserting an address of the access router in the source address field of the binding update message, and forwarding the binding update message without the reverse routing header to the prescribed home agent.

7. The method of claim 4, further comprising:

receiving a second binding update message from the first mobile router specifying a second local care-of address within the address space of the available network prefix and distinct from the second delegated address prefix, the second binding update superseding the local care-of address; and updating the binding cache entry with the delegated address prefix and the first mobile router reachable via the second local care-of address.

8. The method of claim 1, further comprising outputting a router advertisement message specifying an available network prefix for use within the local mobile network, and wherein:

the second mobile router is assigned a second delegated address prefix distinct from the delegated address prefix and within an address space of the available network prefix, the local care-of address within the address space of the second delegated address prefix.

9. The method of claim 8, wherein the registering step includes forwarding a binding update message from the first mobile router to the prescribed home agent, the binding update message specifying at least one of the first mobile router and a native mobile network prefix assigned to the first mobile router by the home agent is reachable via the remote care-of address.

10. The method of claim 9, wherein the forwarding step includes:

removing from the binding update message the reverse routing header, and storing in a binding cache entry that the local care-of address is reachable via the path including the first hop for the path, inserting an address of the access router in the source address field of the binding update message, and forwarding the binding update message without the reverse routing header to the prescribed home agent.

11. A method in a mobile router, the method comprising:

detecting a router advertisement message output by a second mobile router serving as an attachment router for the mobile router, the router advertisement message having a prefix option and a tree information option, the prefix option specifying a first network prefix for use within a local mobile network serviced by the second mobile router, the tree information option specifying an access router as a top level router and that is configured as a delegating router for supplying delegated address prefixes;

generating a local care-of address based on the first network prefix;

outputting a request for a delegated prefix from the access router via the second mobile router;

receiving the delegated prefix assigned by the access router, the delegated prefix distinct from the first network prefix; and advertising the delegated prefix on ingress links of the mobile router.

12. The method of claim 11, further comprising:

generating a home care-of address based on the delegated prefix; and sending via the second mobile router a binding update message to a home agent, specifying at least one of the mobile router and a native mobile network prefix assigned by the home agent to the mobile router is reachable via the home care-of address.

13. The method of claim 12, wherein the outputting and sending steps each include inserting a reverse routing header that includes the local care-of address and a prescribed number of empty slots for the second mobile router and any intervening hops along a path to the access router.

14. The method of claim 12, further comprising:

detecting a second router advertisement message output by the access router and having a second prefix option and the tree information option identifying the access router as the top level mobile router and the delegating router, the second prefix option specifying an available network prefix for use within a local mobile network serviced by the access router;

attaching to the access router by:

(1) replacing the local care-of address with a new local care-of address based on the available network prefix, and (2) sending to the access router a binding update message that specifies that the mobile router and the delegated prefix is reachable via the new local care-of address.

15. An access router configured for providing connectivity to a wide area packet switched network for a local mobile network, the access router including:

a delegation resource configured for supplying to each mobile router a corresponding delegated address prefix, each of the delegated address prefixes within an available network prefix for use within the local mobile network; and a routing resource including a routing table configured for storing, for each delegated address prefix, a corresponding local care-of address for reaching the corresponding mobile router in the local mobile network.

16. The access router of claim 15, wherein the routing resource includes a router advertisement resource configured for outputting a router advertisement message including a prefix option and a tree information option, the prefix option specifying the available network prefix for use within the local mobile network, the tree information option specifying that the access router is a top level router and configured as a delegating router for supplying the delegated address prefix.

17. The access router of claim 16, wherein:
the routing resource includes a reverse routing header resource configured for establishing a source route for reaching a corresponding one of the local care-of addresses based on successive next-hop addresses specified within a reverse routing header of a received message from the corresponding mobile router;
the delegation resource is configured for receiving from a first of the mobile routers a request for a corresponding first delegated address prefix and that includes a reverse routing header specifying a path to the first mobile router including a local care-of address within an address space of the available network prefix, the request further including a source address field specifying a first hop for the path;
the delegation resource is configured for assigning the first delegated address prefix to the first mobile router, from an aggregation of prefixes within the available network prefix, by updating a binding cache entry with the first delegated address prefix reachable via the local care-of address;
the delegation resource sending, to the first hop for the path, the first the delegated address prefix for the first mobile router in a packet including a source route header specifying the path.

18. The access router of claim 17, wherein the local care-of address is within the address space of a second delegated address prefix assigned to a corresponding second one of the mobile routers.

19. The access router of claim 18, wherein:
the routing resource is configured for receiving a binding update message from the first mobile router and destined for a prescribed home agent, specifying at least one of the first mobile router and a native mobile network prefix assigned by the prescribed home agent to the first mobile router is reachable via a home care-of address having the first delegated address prefix;
the reverse routing header resource configured for removing from the binding update message an attached reverse routing header, and storing in a binding cache entry that the local care-of address is reachable via the path including the first hop for the path;
the routing resource configured for inserting an address of the access router in the source address field of the binding update message, and forwarding the binding update message without the reverse routing header to the prescribed home agent.

20. The access router of claim 17, wherein:
the routing resource is configured for receiving a second binding update message from the first mobile router specifying a second local care-of address within the address space of the available network prefix and distinct from the second delegated address prefix, the second binding update superseding the local care-of address; and
the routing resource configured for updating the binding cache entry with the first delegated address prefix and the first mobile router reachable via the second local care-of address.

21. A mobile router comprising:
an egress interface configured for receiving a router advertisement message output by a second mobile router serving as an attachment router for the mobile router, the router advertisement message having a prefix option and a tree information option, the prefix option specifying a first network prefix for use within a local mobile network serviced by the second mobile router, the tree information option specifying an access router as a top level router and that is configured as a delegating router for supplying delegated address prefixes; and
a routing resource including:
(1) a mobility resource configured for generating a local care-of address based on the first network prefix, and outputting via the egress interface a request for a delegated prefix from the access router via the second mobile router, the mobility interface configured for receiving the delegated prefix, distinct from the first network prefix, from the access router, and
(2) an advertisement resource configured for outputting, on an ingress interface, an advertisement message specifying the delegated prefix.

22. The mobile router of claim 21, wherein the mobility resource is configured for generating a home care-of address based on the delegated prefix, and sending via the second mobile router a binding update message to a home agent, the binding update message specifying at least one of the mobile router and a native mobile network prefix assigned to the mobile router by the home agent is reachable via the home care-of address.

23. The mobile router of claim 22, wherein the mobility resource is configured for inserting a reverse routing header that includes the local care-of address and a prescribed number of empty slots for the second mobile router and any intervening hops along a path to the access router.

24. The mobile router of claim 22, wherein:
the egress interface is configured for receiving a second router advertisement message output by the access router and having a second prefix option and the tree information option identifying the access router as the top level mobile router and the delegating router, the second prefix option specifying an available network prefix for use within a local mobile network serviced by the access router;
the mobility resource is configured for to the access router by:
(1) replacing the local care-of address with a new local care-of address based on the available network prefix, and
(2) sending to the access router a binding update message that specifies that the mobile router and the delegated prefix is reachable via the new local care-of address.

25. A computer readable medium having stored thereon sequences of instructions for providing connectivity by an access router for a local mobile network, the sequences of instructions including instructions for:
supplying to a first mobile router a delegated address prefix, based on attachment by the first mobile router to one of the access router and a second mobile router attached to the access router, each mobile router in a local mobile network serviced by the access router receiving a corresponding unique delegated address prefix for use within the local mobile network; and
registering a remote care-of address having the delegated address prefix with a prescribed home agent of the first mobile router, to register a reachability of the first mobile router.

26. The medium of claim 25, further comprising instructions for outputting a router advertisement message having a prefix option and a tree information option, the prefix option specifying an available network prefix for use within the local mobile network, the tree information option specifying that the access router is a top level router and configured as a delegating router for supplying the delegated address prefix.

27. The medium of claim 26, wherein the supplying step includes:
receiving from the first mobile router a request for the delegated address prefix and that includes a reverse routing header specifying a path to the first mobile router including a local care-of address within an address space of the available network prefix, the request further including a source address field specifying a first hop for the path;
assigning the delegated address prefix to the first mobile router, from an aggregation of prefixes within the available network prefix, by updating a binding cache entry with the delegated address prefix reachable via the local care-of address; and
sending to the first hop for the path the delegated address prefix for the first mobile router in a packet including a source route header specifying the path.

28. The medium of claim 27, wherein the second mobile router is assigned a second delegated address prefix distinct from the delegated address prefix and within the address space of the available network prefix, the local care-of address within the address space of the second delegated address prefix.

29. The medium of claim 28, wherein the registering step includes forwarding a binding update message from the first mobile router to the prescribed home agent, the binding update message specifying at least one of the first mobile router and a native mobile network prefix assigned to the first mobile router by the home agent is reachable via the remote care-of address.

30. The medium of claim 29, wherein the forwarding step includes:
removing from the binding update message the reverse routing header, and storing in a binding cache entry that the local care-of address is reachable via the path including the first hop for the path,
inserting an address of the access router in the source address field of the binding update message, and
forwarding the binding update message without the reverse routing header to the prescribed home agent.

31. The medium of claim 28, further comprising instructions for:
receiving a second binding update message from the first mobile router specifying a second local care-of address within the address space of the available network prefix and distinct from the second delegated address prefix, the second binding update superseding the local care-of address; and
updating the binding cache entry with the delegated address prefix and the first mobile router reachable via the second local care-of address.

32. The medium of claim 25, further comprising instructions for outputting a router advertisement message specifying an available network prefix for use within the local mobile network, and wherein:
the second mobile router is assigned a second delegated address prefix distinct from the delegated address prefix and within an address space of the available network prefix, the local care-of address within the address space of the second delegated address prefix.

33. The medium of claim 32, wherein the registering step includes forwarding a binding update message from the first mobile router to the prescribed home agent, the binding update message specifying at least one of the first mobile router and a native mobile network prefix assigned to the first mobile router by the home agent is reachable via the remote care-of address.

34. The medium of claim 33, wherein the forwarding step includes:
removing from the binding update message the reverse routing header, and storing in a binding cache entry that the local care-of address is reachable via the path including the first hop for the path,
inserting an address of the access router in the source address field of the binding update message, and
forwarding the binding update message without the reverse routing header to the prescribed home agent.

35. A computer readable medium having stored thereon sequences of instructions for a mobile router to attach to a local mobile network, the sequences of instructions including instructions for:
detecting a router advertisement message output by a second mobile router serving as an attachment router for the mobile router, the router advertisement message having a prefix option and a tree information option, the prefix option specifying a first network prefix for use within a local mobile network serviced by the second mobile router, the tree information option specifying an access router as a top level router and that is configured as a delegating router for supplying delegated address prefixes;
generating a local care-of address based on the first network prefix;
outputting a request for a delegated prefix from the access router via the second mobile router;
receiving the delegated prefix assigned by the access router, the delegated prefix distinct from the first network prefix; and
advertising the delegated prefix on ingress links of the mobile router.

36. The medium of claim 35, further comprising instructions for:
generating a home care-of address based on the delegated prefix; and
sending via the second mobile router a binding update message to a home agent, the binding update message specifying at least one of the mobile router and a native mobile network prefix assigned by the home agent to the mobile router is reachable via the home care-of address.

37. The medium of claim 36, wherein the outputting and sending steps each include inserting a reverse routing header that includes the local care-of address and a prescribed number of empty slots for the second mobile router and any intervening hops along a path to the access router.

38. The medium of claim 36, further comprising instructions for:
detecting a second router advertisement message output by the access router and having a second prefix option and the tree information option identifying the access router as the top level mobile router and the delegating router, the second prefix option specifying an available network prefix for use within a local mobile network serviced by the access router;
attaching to the access router by:
(1) replacing the local care-of address with a new local care-of address based on the available network prefix, and (2) sending to the access router a binding update message that specifies that the mobile router and the delegated prefix is reachable via the new local care-of address.

39. An access router comprising:

means for supplying to a first mobile router a delegated address prefix, based on attachment by the first mobile router to one of the access router and a second mobile router attached to the access router, each mobile router in a local mobile network serviced by the access router receiving a corresponding unique delegated address prefix for use within the local mobile network; and means for registering a remote care-of address having the delegated address prefix with a prescribed home agent of the first mobile router, to register a reachability of the first mobile router.

40. The access router of claim 39, wherein the registering means includes means for outputting a router advertisement message having a prefix option and a tree information option, the prefix option specifying an available network prefix for use within the local mobile network, the tree information option specifying that the access router is a top level router and configured as a delegating router for supplying the delegated address prefix.

41. The access router of claim 40, wherein the supplying means is configured for:

receiving from the first mobile router a request for the delegated address prefix and that includes a reverse routing header specifying a path to the first mobile router including a local care-of address within an address space of the available network prefix, the request further including a source address field specifying a first hop for the path;

assigning the delegated address prefix to the first mobile router, from an aggregation of prefixes within the available network prefix, by updating a binding cache entry with the delegated address prefix reachable via the local care-of address; and sending to the first hop for the path the delegated address prefix for the first mobile router in a packet including a source route header specifying the path.

42. The access router of claim 41, wherein the second mobile router is assigned a second delegated address prefix distinct from the delegated address prefix and within the address space of the available network prefix, the local care-of address within the address space of the second delegated address prefix.

43. The access router of claim 42, wherein the registering means is configured for forwarding a binding update message from the first mobile router to the prescribed home agent, the binding update message specifying at least one of the first mobile router and a native mobile network prefix assigned to the first mobile router by the home agent is reachable via the remote care-of address.

44. The access router of claim 43, wherein the registering means is configured for:

removing from the binding update message the reverse routing header, and storing in a binding cache entry that the local care-of address is reachable via the path including the first hop for the path, inserting an address of the access router in the source address field of the binding update message, and forwarding the binding update message without the reverse routing header to the prescribed home agent.

45. The access router of claim 42, wherein the registering means is configured for:

receiving a second binding update message from the first mobile router specifying a second local care-of address within the address space of the available network prefix and distinct from the second delegated address prefix, the second binding update superseding the local care-of address; and updating the binding cache entry with the delegated address prefix and the first mobile router reachable via the second local care-of address.

46. The access router of claim 39, wherein the registering means includes means for outputting a router advertisement message specifying an available network prefix for use within the local mobile network, and wherein:

the second mobile router is assigned a second delegated address prefix distinct from the delegated address prefix and within an address space of the available network prefix, the local care-of address within the address space of the second delegated address prefix.

47. The access router of claim 46, wherein the registering means is configured for forwarding a binding update message from the first mobile router to the prescribed home agent, the binding update message specifying at least one of the first mobile router and a native mobile network prefix assigned to the first mobile router by the home agent is reachable via the remote care-of address.

48. The access router of claim 47, wherein the registering means is configured for forwarding the binding update message based on:

removing from the binding update message the reverse routing header, and storing in a binding cache entry that the local care-of address is reachable via the path including the first hop for the path, inserting an address of the access router in the source address field of the binding update message, and forwarding the binding update message without the reverse routing header to the prescribed home agent.

49. A mobile router comprising:

means for detecting a router advertisement message output by a second mobile router serving as an attachment router for the mobile router, the router advertisement message having a prefix option and a tree information option, the prefix option specifying a first network prefix for use within a local mobile network serviced by the second mobile router, the tree information option specifying an access router as a top level router and that is configured as a delegating router for supplying delegated address prefixes, the detecting means including means for generating a local care-of address based on the first network prefix;

means for outputting a request for a delegated prefix from the access router via the second mobile router, and for receiving the delegated prefix assigned by the access router, the delegated prefix distinct from the first network prefix; and means for advertising the delegated prefix on ingress links of the mobile router.

50. The mobile router of claim 49, wherein:

the generating means is configured for generating a home care-of address based on the delegated prefix; and the outputting means is configured for sending via the second mobile router a binding update message to a home agent, the binding update message specifying at least one of the mobile router and a native mobile network prefix assigned to the mobile router by the home agent is reachable via the home care-of address.

51. The mobile router of claim 50, wherein the detecting means includes means for inserting, into the request and the binding update message, a reverse routing header that includes the local care-of address and a prescribed number of empty slots for the second mobile router and any intervening hops along a path to the access router.

52. The mobile router of claim 50, wherein:

the detecting means is configured for detecting a second router advertisement message output by the access router and having a second prefix option and the tree information option identifying the access router as the top level mobile router and the delegating router, the second prefix option specifying an available network prefix for use within a local mobile network serviced by the access router;

the generating means is configured for attaching to the access router by:

(1) replacing the local care-of address with a new local care-of address based on the available network prefix, and (2) sending to the access router a binding update message that specifies that the mobile router and the delegated prefix is reachable via the new local care-of address.

* * * * *